United States Patent Office 3,114,976
Patented Dec. 24, 1963

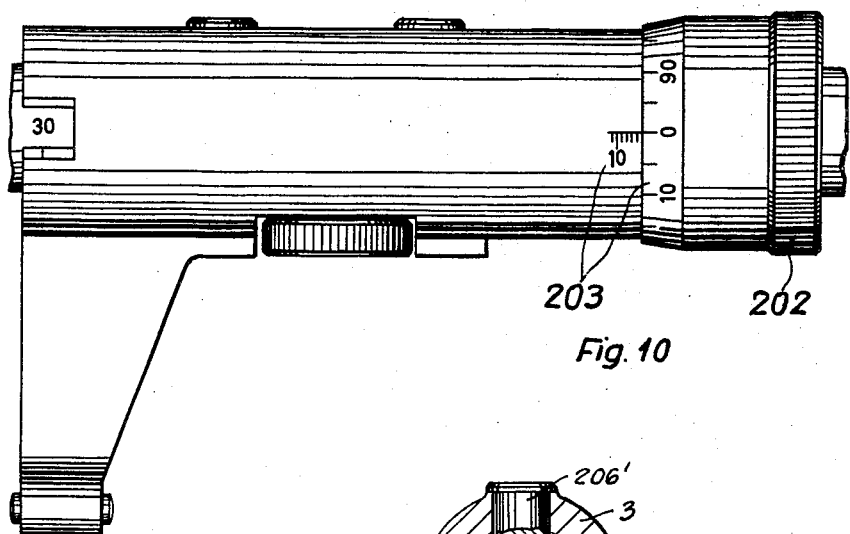
Fig. 10
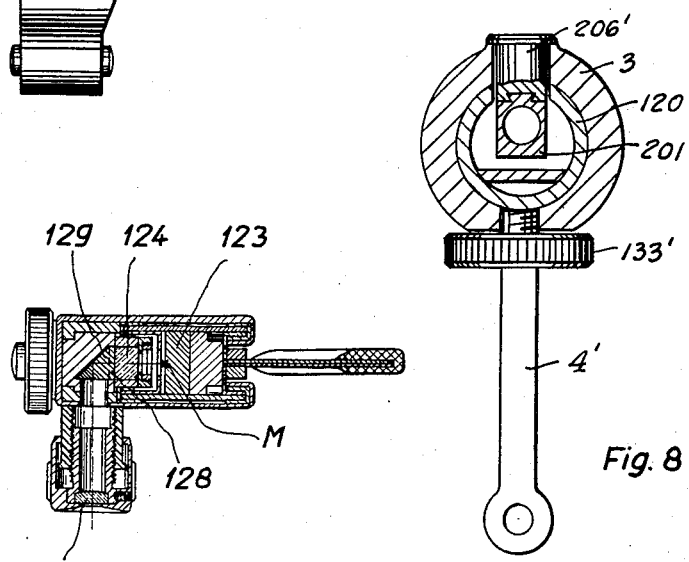
Fig. 8
Fig. 2

3,114,976
SLIDE GAUGES, SCREW GAUGES, OR THE LIKE
Kurt Räntsch, Wetzlar (Lahn), Germany, assignor to M. Hensoldt & Söhne, Optische Werke A.G., Wetzlar (Lahn), Germany
Filed Aug. 5, 1960, Ser. No. 47,738
Claims priority, application Germany Aug. 21, 1959
13 Claims. (Cl. 33—143)

The present invention relates to slide gauges, screw gauges, or the like, provided with two measuring shanks, which are displaceable relative to one another, and a scale for reading the displacement of said shanks.

Slide gauges are known which are provided with a mark, a vernier, or the like, disposed on the movable part of the device for reading the magnitudes of the displacement of the movable measuring shank on the scale. The scale is arranged on the guide for the displaceable parts. The limits of accuracy in these known slide gauges are such that the comparator principle of Abbe cannot be preserved. According to this principle the measuring axis should coincide with the scale, but this is not the case because the object to be measured is placed between the shanks of the slide gauge. A strong pressure of the measuring shank towards said object to be measured would result in a rotary movement of the movable part of the gauge, and the mark on the scale would show an incorrect value.

Furthermore, when using a mark or vernier, only a certain degree of accuracy can be obtained so that in order to attain more accurate results the much more expensive micrometer has to be used. The disadvantage of the micrometer is, however, its small measurement range.

The object of the present invention is to improve the simple and inexpensive slide gauges and screw gauges in order to increase their accuracy.

This is obtained in accordance with the invention by the provision of optical means used for superimposing the mark with a graduation of the scale. Furthermore, means are provided for displacing the image of the mark relative to the graduation in order to determine a precision measurement value, or in case of a screw gauge, for a precision adjustment of the displaceable measuring shank to a scale value. The reading is effected by auxiliary optical means which, due to a magnification of the scale portion, permit a reading with more decimals than ever before. In case of a screw gauge a more accurate adjustment of the displaceable measuring shank relative to the graduations of the scale will be possible and thus more accurate results will be obtained. The inventive provision of the optical means will also permit a compensation of any guide errors.

In the first embodiment of this invention are provided for this compensation of guide errors two objectives in the path of the image ray, between which objectives the rays are parallel. One of the objectives is disposed in the displaceable part and the other in the stationary part of the device. Furthermore, at least one plane mirror is provided in said displaceable part between the scale and the objective for the displacement of the positive nodal point of the objective in the measuring axis, and the distance of the measuring axis from the plane of the scale is selected to be equal to the focal length of the displaceable objective.

This construction of the image projection path has the effect, as will be disclosed on hand of an example of the invention, that the tilting of the displaceable shank and the thus produced measurement errors will be automatically compensated.

In further development of the invention this construction can be effected in two different manners. In case the measuring axis and the projecting means are disposed on the same side of the scale, an even number of reflecting surfaces, preferably a penta prism, is provided between the objective and the scale. When the measuring axis and the reading means due to construction reasons are disposed on the opposite sides of the scale, an odd number of reflecting surfaces, preferably a right angular prism, is provided.

It has been found to be advantageous to project the mark by the objectives and the penta prism onto the scale, and to design one of the reflecting surfaces of the prism as a semi-transparent surface so that the position of the mark on the scale can be observed by this surface. Preferably, an optical wedge is cemented onto said semi-transparent surface so that the penta prism can form a plane-parallel plate for observation of the scale and the mark.

A profiled bar is advantageously provided for guiding the displaceable parts of the device, the scale being arranged on said bar. Since the scale cannot be observed with the naked eye in this case, a further development of this invention provides a further scale which is preferably arranged on said bar for reading the rough measurements by means of an index.

In case the slide gauge is in the form of a screw gauge, i.e. a measuring screw is provided on one of the measuring shanks which screw is brought in direct contact with the object to be measured, a detent means is provided on the device so that the displaceable measuring shank can be moved over large scale intervals, for instance over centimeter long intervals. The optical means are used hereby for the control of the exact position of the measuring shank on the scale after the shank has been locked in its respective position, and a further means is provided for the adjustment of the displaceable measuring shank. Said detent means need not be particularly precise in its construction, as is the case of the known slide gauges.

If means, such as micrometers, are provided for the reading of precise measuring values, whereby said means act upon the optical parts of the image ray path, then the measuring shanks preferably are provided with spherical end measuring rods which are brought into contact with the object to be measured. These spherical ends are designed in such a manner that they can be used for measurements of inner and outer diameters.

A scale with transversely extending double-line marks arranged at centimeter, inch, or half-inch spaced intervals, respectively, is used as a scale, and the mark has the form of a single-line mark which is used for being brought to lie between the double line.

When a scale portion is projected into a reading window, this reading window is preferably formed by a plane surface or an ocular lens.

In the drawing which illustrates several embodiments of the invention:

FIG. 2 shows a cross section along the line II—II in FIG. 1,

FIG. 8 shows a cross section along the line VIII—VIII of FIG. 7,

FIG. 10 shows the elevation of the device according to FIGS. 7 and 8,

Figure 1:
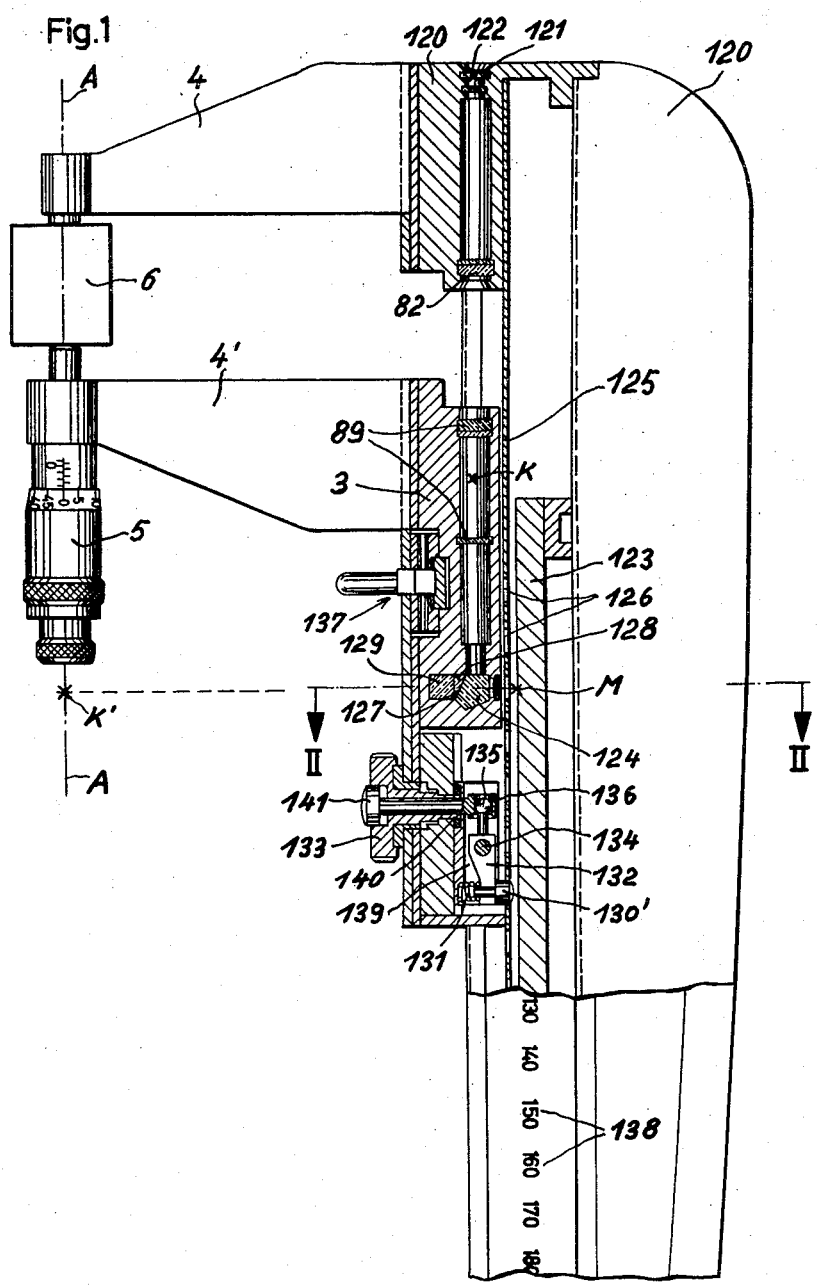
FIG. 1 shows a first embodiment of this invention.

According to FIGS. 1 and 2, a fixed measuring anvil or shank 4 is fastened to a body 120 in the form of a guide bar. A carriage 3 with a movable measuring anvil or shank 4' and a measuring screw 5 are slidably mounted on the guide bar body 120. A single-line mark 122 is provided on a glass plate 121 in the guide bar body 120 which mark extends in a direction normal to the plane of the shank 4. This mark is projected by means of an objective 82 into the infinite. A measuring rule 123 is provided with double-line graduation marks and is connected to the guide bar body in which the double lines for each predetermined distance such as one centimeter etc., extend transversely through the longitude of the rule 123. The double lines are spaced from each other by intervals of one centimeter. A further objective 89 is provided in the carriage 3 and concentrates the parallel light rays, which leave the objective 82, on the measuring rule. The light rays coming from the objective 89 are deflected at a right angle by a penta prism 124. A sheet 125 with openings 126 is provided between the penta prism 124 and the rule 123. The openings are spaced one centimeter from each other so that a mark 122 can be projected through such an opening to a point M of the rule. The light rays coming from this point M on the rule penetrate a semi-transparent layer 127 of the penta prism 124. A glass wedge 128 is cemented on the semi-transparent layer 127 in such a manner that the penta prism forms a plane-parallel plate for the light rays emerging from said measuring point M. A further prism 129 is cemented on said wedge 128 and this prism 129 deflects the light rays into an ocular 130.

A pin 130' having a spherical head engages said openings 126. The pin 130' is fastened on a lever 132 which is rotatable around a pivot 134 and is under the pressure of a spring 131. The other end of the lever 132 is provided with a spherical head 135 which is movable in a guide 136 parallel to said rule. The lever 132 is supported in a carriage 139 which is displaceable in parallel to the rule and can be displaced in small amounts by a knurled screw 133 having an eccentric projection 140. The displacement is such that the pin 130' need not be removed from the opening 126. This displacement is used for correcting the position of the carriage 3. By pressing the button 141 the pin 130' is withdrawn from its correspondingly positioned opening 126 in the guide bar body against the action of a coil spring 131. Subsequently, the carriage 3 can be displaced to any desired position and then locked by the pin 130'.

Furthermore, a clamping device 137 is provided in said carriage 3, which firmly engages the guide bar body to adjustably lock the carriage 3 to the guide bar body 120.

The guide bar body 120 is provided with a numbered graduation 138 on which can be read the large displacements of the carriage 3 by means of an index (not shown).

The spacing of the graduation marks M are arranged to correspond to the spacings of the graduations 138 on the guide bar body so that a visible indication mark on the carrier 3 can be brought into registery with one of the graduations 138 and will thus position the carriage and anvil 4' a corresponding approximate distance from the anvil 4 with the single mark projection extending approximately between a pair of marks M.

Figure 9:
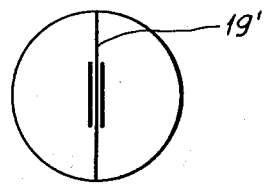
FIG. 9 shows the field of view of the device according to FIGS. 7 and 8.

The operation of this slide gauge is as follows:

The object 6 to be measured is placed between the fixed and movable measuring anvils or shanks 4 and 4', and the carriage 3 is moved until the upper end or the head of the screw 5 touches the object 6. The pin 130' will engage one of the openings 126, and on the scale 138 may now be read a rough value of the measurement. In the event that one of the openings 126 is not accurately formed, i.e. that the movable anvil or shank 4' is not exactly positioned according to the value indicated on the scale 138, or in case the movable measuring anvil or shank 4' is slightly tilted due to an error in the guide bar body, then the knurled screw 133 is to be rotated, hereby moving the carriage 3 in the direction of the scale to such an extent that the mark 122 is positioned exactly between the double line at the measuring point M (FIG. 9). This position of the mark relative to said double line can be observed through the ocular 130. After making this adjustment the device 137 is locked so that the carriage 3 cannot be moved any more. Subsequently, the precise measurement is determined by means of the measuring screw 5 in that the screw is rotated until its head contacts the object 6 to be measured. The precise value of the measurement is then read on the measuring screw 5.

In order to prevent an error in the measurement due to an error in the guide bar body, the arrangement is such that the positive nodal point K of the objective 89 is virtually projected towards K' by the penta prism 124, whereby the point K' is positioned on the measuring axis A—A. Any tiltings of the movable measuring anvil or shank 4' can always be transformed into a tilting about K' and into a parallel displacement, which is of no importance whatsoever for the measurement, so that the above mentioned constant positioning of the image of the mark is assured. It will thus be seen that if excessive pressure is exerted on the anvil or shank 4' while measuring a workpiece, the anvil will be slightly deflected, and the present invention provides visible means for indicating the correct pressure without disturbing the alignment of the marks 122 and M.

Figure 11:
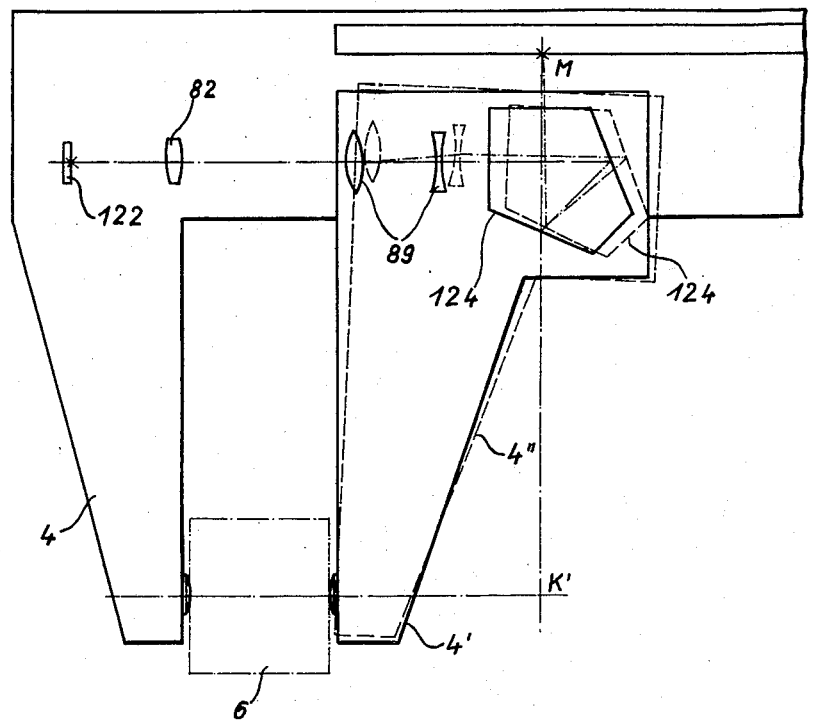
FIG. 11 shows a schematic representation of the path of the rays.

FIG. 11 shows a simplified path of the rays. The mark 122 is projected by the lenses 82 and 89 as well as by the penta prism 124 to the measuring point M. When the measuring shank 4' tilts about this point into the position 4'', the lenses 89 and the prism 124 will perform a corresponding rotation into the position indicated by dotted lines. The projecting ray path will not be influenced thereby so that the mark 122 remains projected to said position at the point M.

Figure 3:
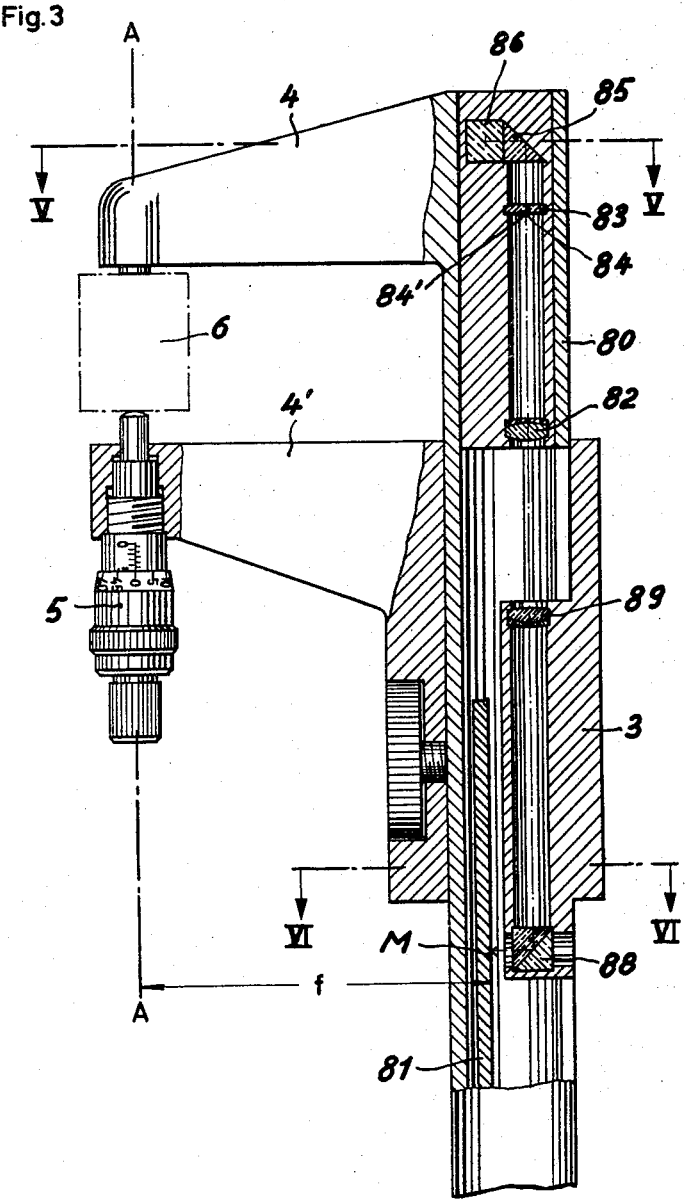
FIG. 3 shows a further embodiment of the invention.
Figure 4:
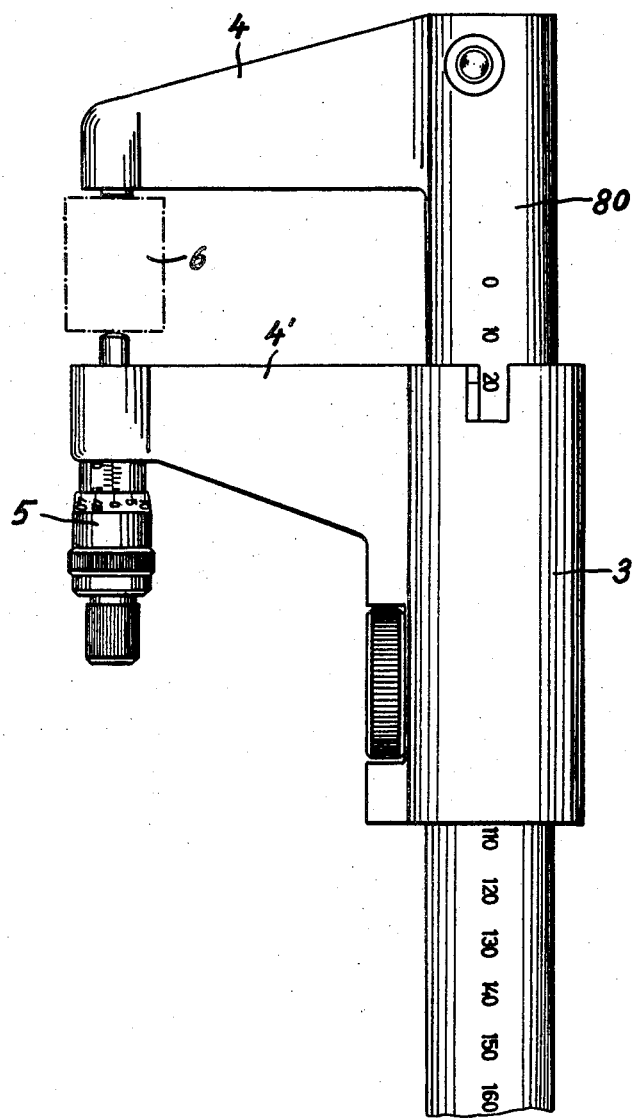
FIG. 4 shows the elevation of the device according to FIG. 3.
Figure 5:
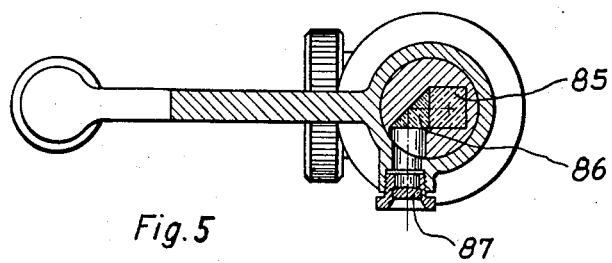
FIG. 5 shows a cross section along the line V—V of FIG. 3.
Figure 6:
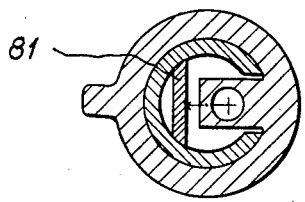
FIG. 6 shows a cross section along the line VI—VI of FIG. 3.

FIGS. 3 to 6 inclusive show a modified embodiment of this invention. Also in this case, any measuring errors due to the inaccuracy of the guide bar body are corrected according to the same principle indicated above. The guide bar body of the slide gauge is formed as a tube 80 and is provided with a fixed measuring anvil or shank 4 as before. The carriage 3 is likewise slidably mounted on the tubular guide bar body 80 and is provided with a movable measuring anvil or shank 4' and a micrometer measuring head is also mounted on the anvil 4' as before. In said tube 80 is arranged the scale 81 which corresponds to the scale 123 in FIGURES 1 and 2, the objective 82 and an ocular lens 83 are positioned in the focal point of said objective 82. The ocular lens 83 has a plane surface 84 which is used as a reading window and is provided with a mark 84'. The light rays leaving the lens 83 are directed to a further lens 87 by the prisms 85 and 86 which are also arranged in the stationary part of the device (FIG. 5). A deflecting prism 88 is provided together with an objective 89 in the carriage 3 which slides along the tube 80. The objective 89 is disposed at a distance equal to its focal length away from the measuring point M. The light rays coming from the measuring point M will, therefore, leave the lens 89 in parallel and are collected by a lens 82 onto the plane surface 84. The distance of the scale 81 from the measuring axis A—A is also equal to the focal length f, thus providing all the prerequisites for fulfilling the above mentioned principle. In this case, the prism 88 is also provided to displace the positive nodal point of the system 89 together with the mirror 88 into the measuring axis A—A. Contrary to the showing in FIG. 1, only a single plane mirror is provided between the objective 89 and the scale 81. This arrangement is necessary because the optical parts and the measuring axis A—A are disposed on different sides relatively to the scale 81 which is not the case in the embodiment according to FIGS. 1 and 2. When the object 6 to be measured is inserted into the slide gauge and tilts hereby the carriage 3, this will not influence the measuring values, because, as in the above mentioned case, the measuring point M remains in coincidence with the mark 84' in the reading window 84. The pairs of spaced marks M are spaced a distance equal to the spacing of the graduations 138 on the guide body as before.

In accordance with FIGS. 1 to 6, the projection of the mark is used only for the adjustment of complete centimeter values, while the millimeter values and fractions thereof were obtained by the adjustment of the measuring screw 5.

Figure 7:
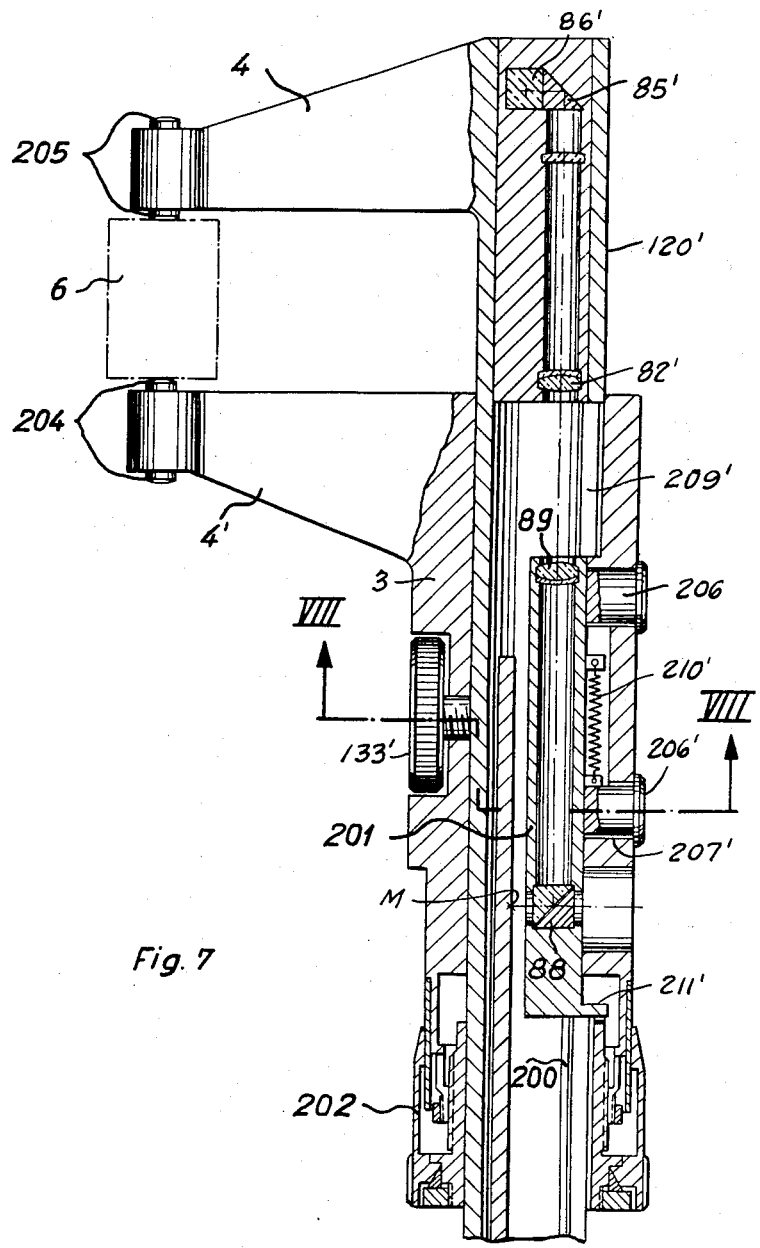
FIG. 7 shows a modified embodiment in cross-section.

In the modified form of the invention shown in FIGURES 7, 8 and 10 the device is provided with a tubular support 120' having an anvil or shank 4 with combined internal and external measuring contacts 205. A slide carrier 3 is mounted for movement along the tubular support 120' and has formed at one end thereof an anvil or shank 4'. Internal and external contacts 204 are carried by the end of the anvil 4' which are adapted to cooperate with the contacts 205 and form opposed contacts when internal and external measurements are made. The slide carrier 3 can be locked in any predetermined position by means of the knurled locking screw 133'. Slidably supported within the tubular support 120' is a carrier housing 201 having a bore in which a lens 89 is mounted at one end of the bore while a prism 88 is mounted at the opposite end of the bore. The carrier 201 is slidably supported by guide pins 206' which operate in aligned slots 207' in the slide carriage 3. The tubular support 120' is slotted as at 209' to permit slight movement of said guide pins 206' and sliding adjustment of the housing 201. A coil spring 210 has one end connected to the carriage 201 and the other end connected to the lowermost pin 206' to yieldingly urge the carriage toward one end of the tubular support 120'. Formed on the lowermost end of the carriage 201 is a radial projection 211' which projects through the slot 209' in the lower end of the tubular support 120' and projects into the path of a micrometer screw 202.

Mounted in a bore in the upper end of the tubular support 120' is an objective lens 82' and a prism 85' facing an occular 86'.

The operation of this device is as follows:

When the measuring anvil or shanks 4 and 4' are brought into contact with the object 6 to be measured, the image 19' (FIG. 9) of the mark will seldom appear between the double lines of the scale. The measuring screw 202 is now turned until this condition is obtained (FIG. 9) and the precise value of the measurements is read at the corresponding point of the measuring scale 203.

Figure 12:
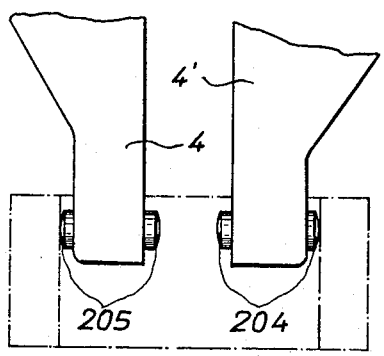
FIG. 12 shows another modified embodiment of the invention.

Contrary to the arrangements according to FIGS. 1 to 6, the above described arrangement permits in simplest manner the determination of inner and outer diameters. For this purpose the ends of the measuring shanks 4 and 4' merely need to be provided with spherical work engaging contacts 204 and 205 which permit (according to FIG. 12) the determination of the inner and outer diameters.

In FIGURES 3 and 4, the movable slide 3 is adapted to be locked in a preselected position by means of knurled locking screws 133" and 133'" respectively.

What I claim is:

1. In a portable machinist's slide gauge, screw gauge, or the like, comprising a pair of relatively displaceable measuring shanks forming stationary and displaceable parts, graduations on the stationary part denoting units of measurement to register with an indicator on said displaceable part, work engaging contacts on said shanks to be displaceable opposite each other, a measuring bar mounted within said stationary part, a series of marks spaced apart a distance equal to the measuring units on said stationary part, optical means mounted within said stationary part for projecting an indicator mark into superposed relation with at least one of the marks on said scale to indicate a precise measurement value corresponding to the predetermined unit of measurement denoted on the stationary and displaceable parts.

2. A slide gauge according to claim 1, in which said projecting means consists of a projection system containing two objectives between which the rays extend in parallel, one of said objectives being disposed on the displaceable part of the device and the other objective on the stationary part of the device, at least one plane mirror disposed in the displaceable part between said scale and said objective, said mirror being provided for the displacement of the positive nodal point of said objective in the measuring axis of said scale, and the distance between said measuring axis and the scale plane being selected to be equal to the focal length of said displaceable objective.

3. A slide gauge according to claim 2, in which the measuring axis of said scale and said projection system are arranged on the same side of said scale, an even number of plane mirrors being arranged between said objective and said scale, said plane mirrors including a penta prism which will virtually project said positive nodal point of said objective into said measuring axis.

4. A slide gauge according to claim 2, in which said projecting system includes a device for reading the alignment of said projected mark relative to said marks on said scale and in which the measuring axis of said scale and said reading device are arranged on opposite sides of said scale, and, a rectangular prism located between said objective and said scale forming an odd number of reflection surfaces.

5. A slide gauge according to claim 3, in which said means for projecting said mark by said objectives includes a penta prism for directing an image of the indicator mark onto said scale, and a semi-transparent reflection surface on said penta prism, which surface permits the observation of the position of said mark on said scale.

6. A slide gauge according to claim 3, in which said means for projecting said mark by said objectives and said penta prism onto said scale includes, a semi-transparent reflection surface on said penta prism, which surface permits the observation of the position of said mark on said scale, and a glass wedge cemented onto said semi-transparent reflection surface in such a manner that said penta prism forms a plane parallel plate for observation of said scale and said mark.

7. A slide gauge according to claim 2, including a profiled beam for guiding said displaceable parts, said graduations being arranged longitudinally on said beam.

8. A slide gauge according to claim 2, including a profiled beam for guiding said displaceable parts, said graduations being marked and arranged on said beam, and said scale with the series of marks being located within said beam.

9. A slide gauge according to claim 1, including detent means for locking the displaceable measuring shank at points corresponding to scale intervals, means for precise adjustment of said measuring shank whereby said projected mark is employed for the control of the precise adjustment of said displaceable measuring shank onto a scale interval, and a micrometer screw is carried by one of said shanks for determination of precise measurement values, said micrometer screw being connected with one of said measuring shanks.

10. A slide gauge according to claim 1, in which the series of graduations on said scale is formed by sets of double lines with the sets spaced one centimeter from each other, said projected mark being formed as a single line.

11. A slide gauge according to claim 1, in which said optical means projects a section of said scale into a reading window, said reading window being formed by the plane surface of one of said ocular lenses.

12. A slide gauge according to claim 1, in which the opposed contacts on said measuring shanks are provided at their ends with spherical surfaces which permit the determination of the sizes of outer and inner diameters.

13. In a portable machinist's slide gauge and the like, comprising an elongated body member, a series of graduations on said body member denoting units of measurement, an anvil on one end of said body member, a slide mounted on said body member for movement therealong, an anvil on said slide, work engaging contacts carried by said anvils and arranged in opposed relation, a scale bar associated with said body member, a series of transversely extending marks arranged in spaced relation on said body member corresponding to the spacing of the graduations on said body member, optical means for projecting a mark in the direction of said scale bar for registry with the transverse marks thereon, an occular lens associated with said optical projecting system to permit said projected mark to be sighted with relation to said transverse marks on said scale bar and means for locking said slide in predetermined adjusted positions, said slide being adjusted according to the graduations on said body member to an approximate position and then finally adjusted by sighting the projected mark through the objective with relation to the transverse marks on said scale bar.

References Cited in the file of this patent

UNITED STATES PATENTS 2,474,602    Turrettini              June 28, 1949

FOREIGN PATENTS 1,001,008    Germany               Jan. 17, 1957